Patented Jan. 25, 1938

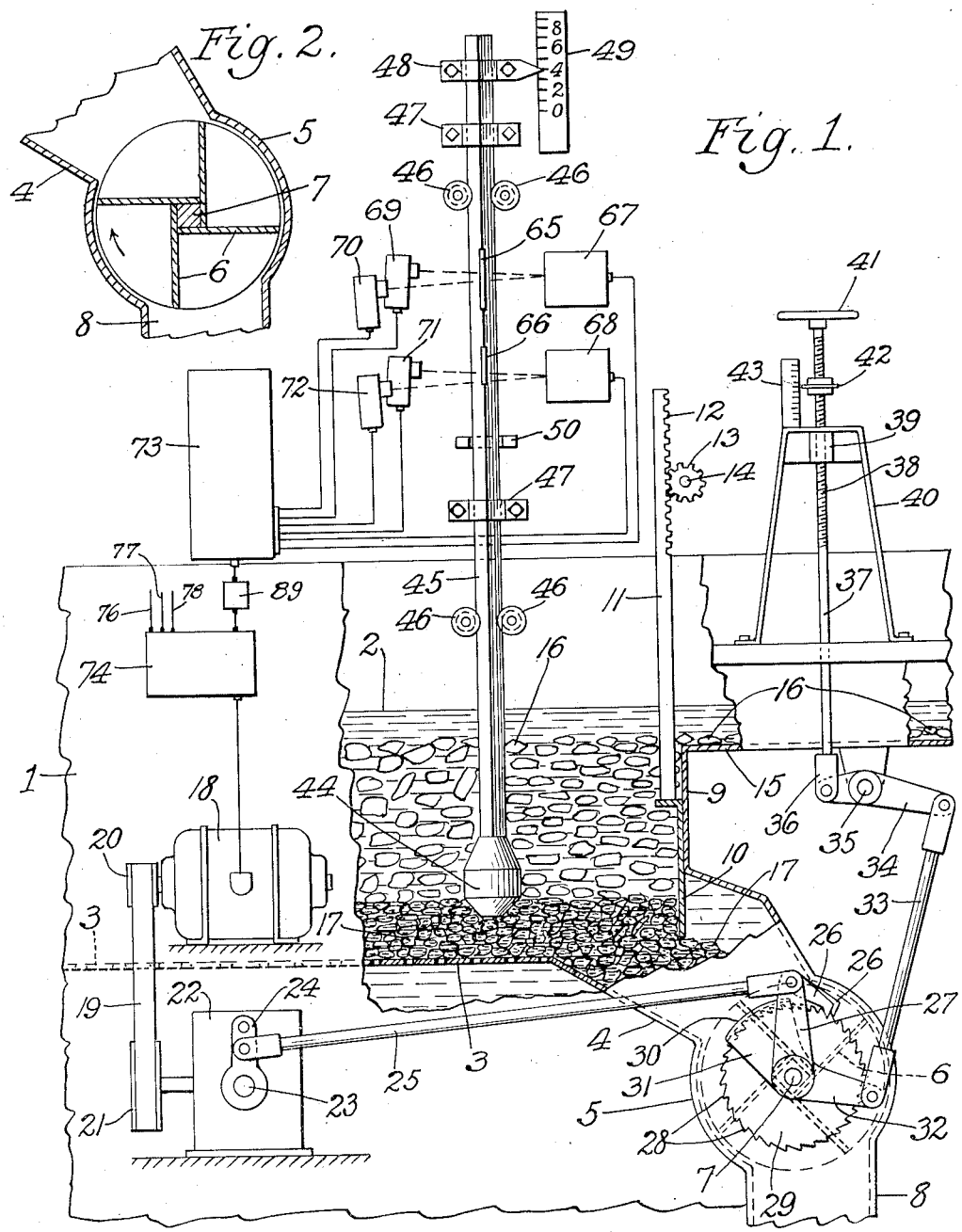

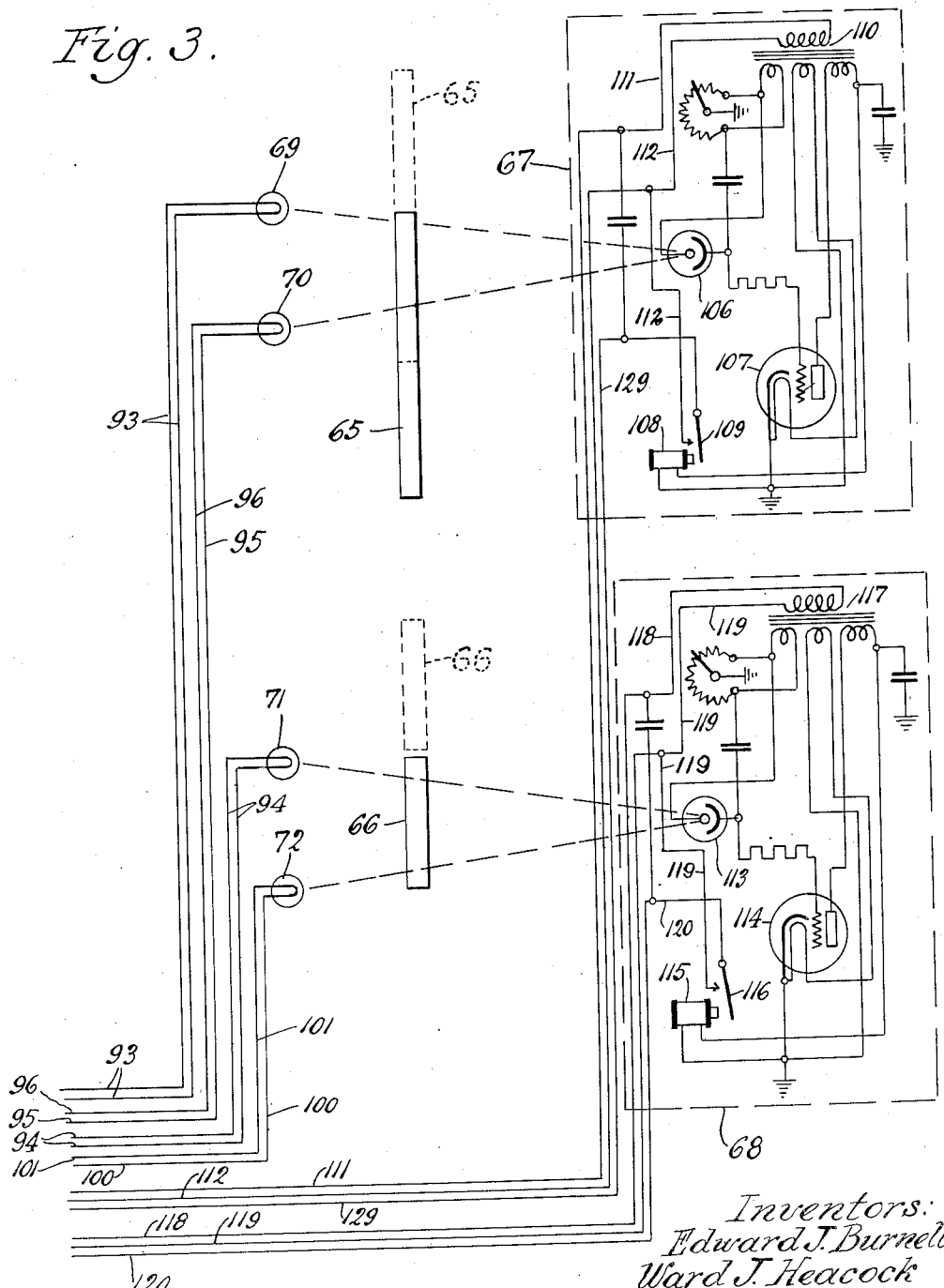

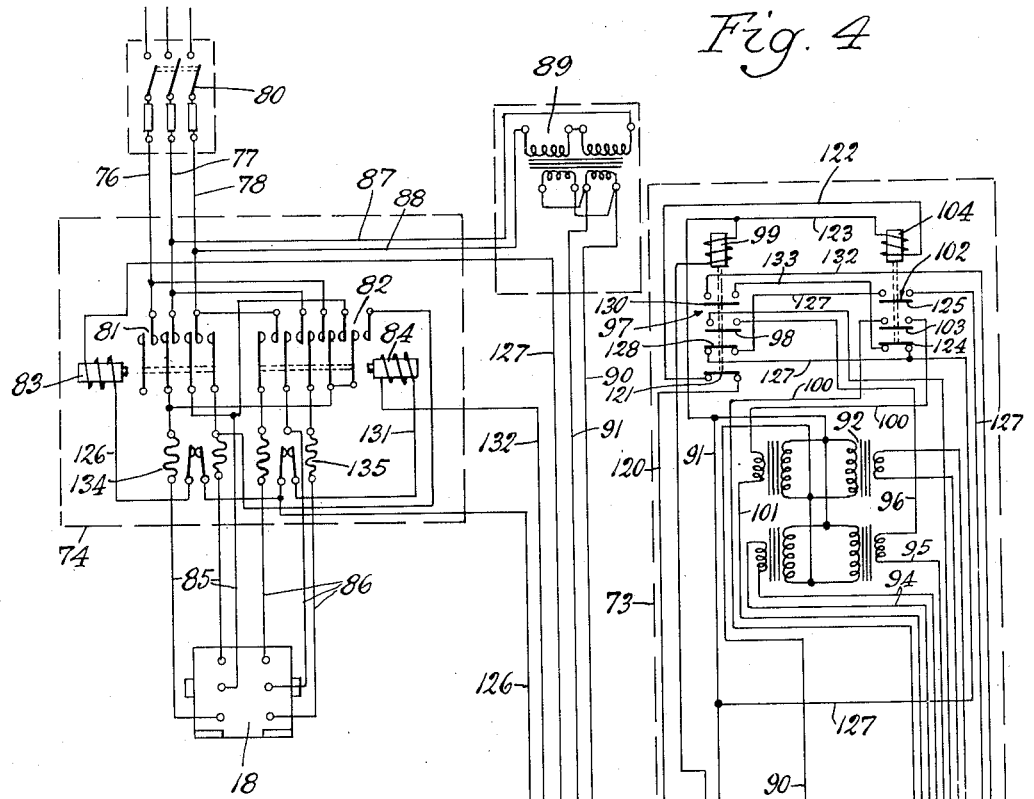
Fig. 4
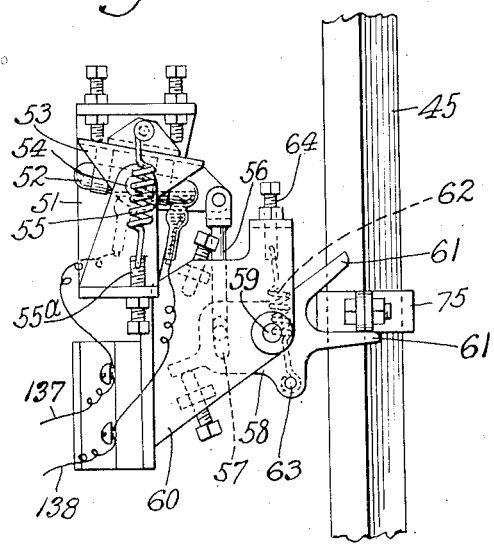
Fig. 5
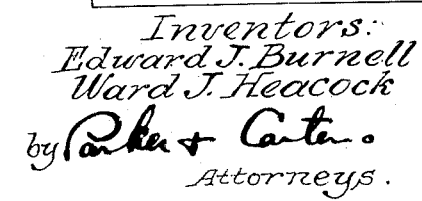
Inventors:
Edward J. Burnell
Ward J. Heacock
by Parker + Carter
Attorneys.

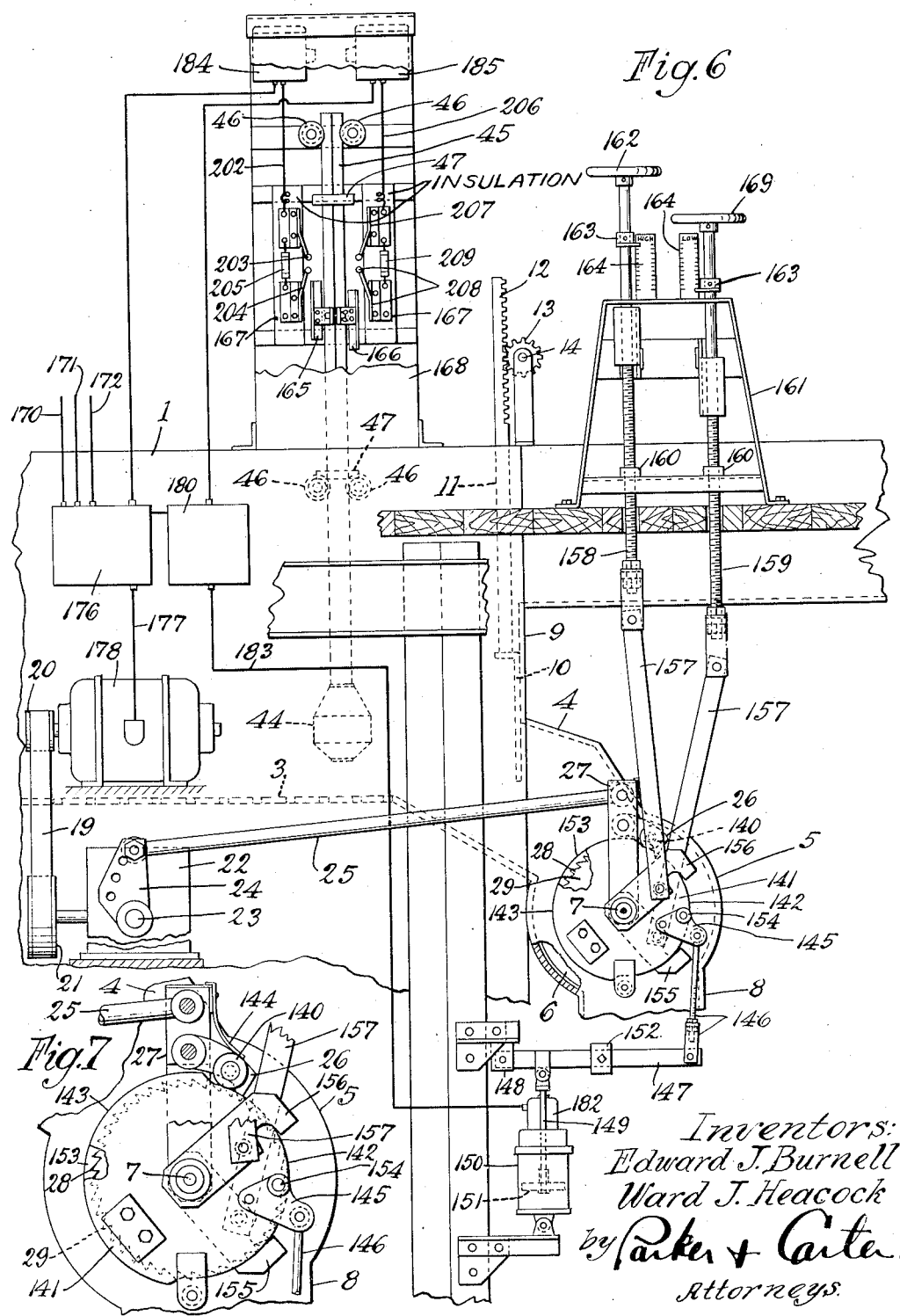

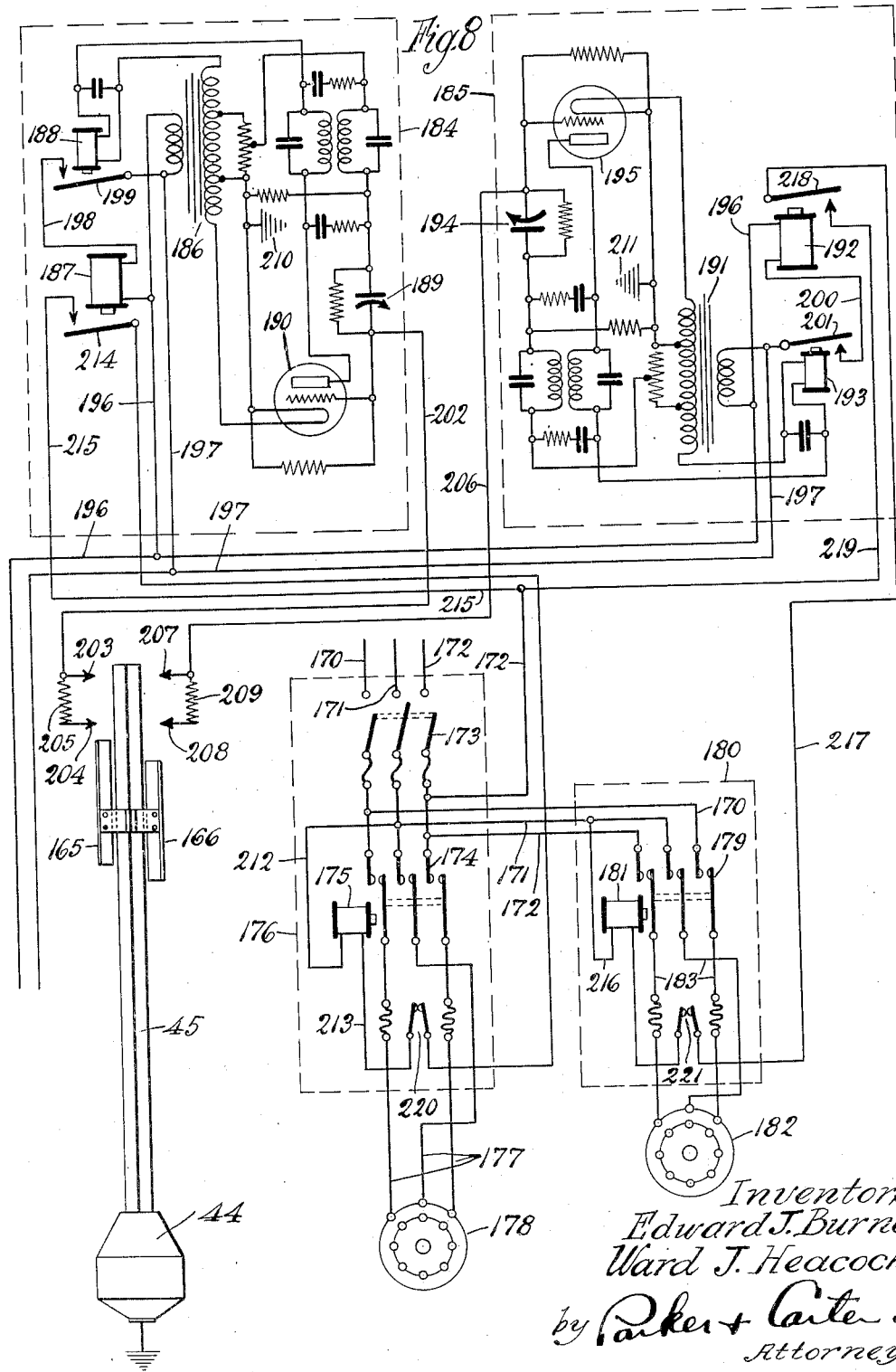

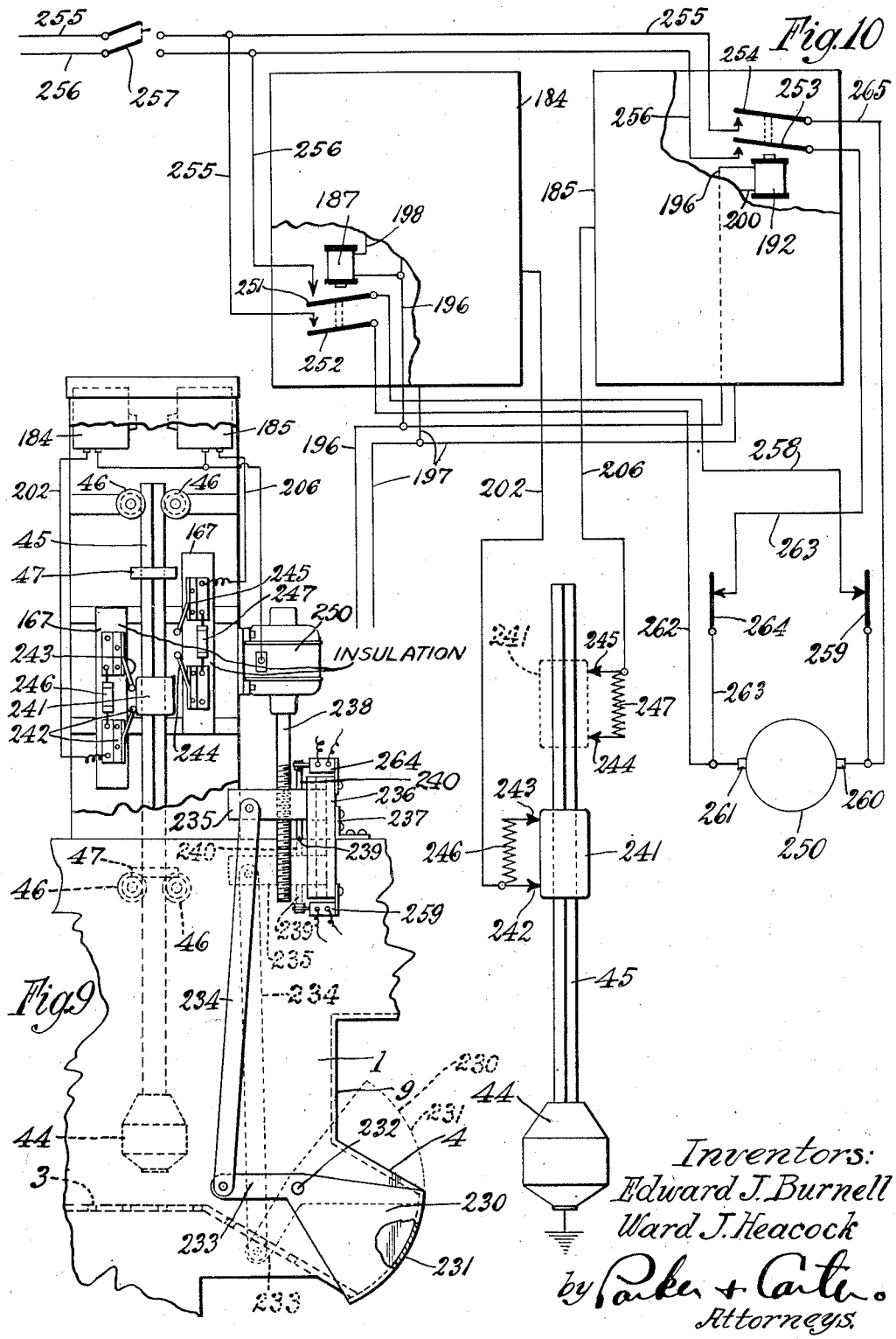

2,106,204

UNITED STATES PATENT OFFICE 2,106,204

WASH BOX DISCHARGE CONTROL

Edward J. Burnell and Ward J. Heacock, Chicago, Ill., assignors to Link-Belt Company, Chicago, Ill., a corporation of Illinois Application January 28, 1935, Serial No. 3,800

11 Claims. (Cl. 250—41.5)

This invention relates to a control for a wash box discharge. In the form illustrated herewith it comprises an automatic refuse regulator adapted primarily for regulating and controlling the discharge of refuse from a wash box which is designed and arranged to wash coal and to separate the coal from the impurities present in it. The invention may be applied to other devices, and the form illustrated herewith is merely typical of one use.

An object of the invention is to provide means in connection with wash boxes for automatically regulating the discharge of refuse. Another object is to provide also an automatic regulator which is free from mechanical connections. Another object is to provide such an automatic regulator in which the regulating means is sensitive to changes in conditions within the wash box and which responds readily to such changes to provide the desired results in the control of the refuse discharged. Another object is to provide in such a refuse discharge control photo-electric cells and light sources and a float adapted to be moved by the bed of refuse to effect the desired control through co-operation with the light sources.

Other objects will appear from time to time in the specification and claims.

The invention is illustrated more or less diagrammatically in the accompanying drawings, wherein:—

Fig. 1 is a diagrammatic vertical section through a wash box with some parts shown in elevation;

Fig. 2 is a transverse vertical section through the refuse discharge gate;

Figs. 3 and 4 form together a wiring diagram of the control means and the motor circuit;

Fig. 5 illustrates a contact switch of the mercury type;

Fig. 6 is a diagrammatic side elevation of a variant form of wash box and control with parts shown in section;

Fig. 7 is an enlarged detail of the speed changing mechanism of the refuse gate shown in Figure 6;

Fig. 8 is a wiring diagram of the control means and motor circuit for the form of Figure 6;

Fig. 9 is a fragmentary diagrammatic illustration of the control of Fig. 6 applied to an uppercut or swinging gate; and Fig. 10 is a wiring diagram for the device illustrated in Figure 9.

Like parts are designated by like characters throughout the specification and drawings.

1 is a wash box, the details of which form no essential part of the invention. They are illustrated herewith only sufficiently to show a typical installation of the control device. The wash box, in the form shown herewith, is filled with water to the level 2. A suitable housing is provided with necessary walls to retain the water and means are arranged for supplying the water. At a desired point within the wash box a perforated plate 3 is mounted and it is along this plate that the bed of material being treated passes. Preferably at one end of the perforated plate 3 is mounted a refuse chute 4, suitably enlarged as at 5 to receive a rotary refuse gate 6 which is mounted upon a shaft 7. A final discharge chute 8 carries away refuse after it has passed through the gate 6. A generally vertical wall 9 forms an abutment for guiding refuse to the refuse chute and a movable slide gate 10 is mounted against the wall 9. It is carried by a rod 11, which has a rack 12 formed at its upper end and meshes with a pinion 13 on a shaft 14. By means of this construction the gate 10 may be adjusted into or out of the mouth of the refuse chute 4 so as to control the amount of refuse passing into it toward the gate. A bottom plate 15 above the refuse level forms a part of the wash box and serves to carry the separated and cleaned material on for discharge or for further treatment.

It is to be understood that the water within the wash box is preferably given a pulsating movement so that it rushes up through the perforated plate 3, tending to raise and open out the material which is under treatment within the box. This material is supplied from any suitable source and flows across the wash box from left to right as shown in Figure 1. Ordinarily, if coal is being treated, it is lighter than the impurities and the coal tends to rise and form the top layer 16 of the bed of material. The impurities being heavier than the coal tend to fall or seek a lower level and form thus the level or layer of impurities 17 and it is from this layer of impurities that the refuse is discharged into the chute 4.

The discharge gate 6 has been described as a rotary gate and it is shown in that form. Other forms of gates might be used and the invention is not limited to any particular refuse gate. As shown, however, the gate revolves through a ratchet and pawl connection. It is driven by a motor 18, the controls of which will be described below. By means of a chain or other power transmitting means 19, which meshes with a pulley 20 on the motor and a pulley 21 of a speed reducer 22, the motor operates the reducer which may be of any desired form. A shaft 23 of the reducer carries a crank arm 24 to which is attached a connecting rod 25. The connecting rod carries at its opposite end a pair of pawls 26, 26. A radius arm 27 is also attached to the outer end of the connecting rod 25 and is pivoted about the shaft 7 of the refuse gate. The pawls engage the teeth 28 of a ratchet 29 which is fixed on the refuse gate shaft 7.

30 is a cam preferably attached to one or more members 31, pivoted about the refuse gate shaft 7. The member 31 carries an arm 32 which at its outer end has pivoted on it a connecting rod 33, the other end of which is pivoted on the long arm of a lever 34 which is itself pivoted at 35. To the short arm of the lever 34 is pivoted a shaft receiving member 36 within which the lower end of a controlling and adjusting rod 37 is mounted for rotation. This rod is threaded toward its upper end as at 38 and received in an interiorly threaded member 39 which is carried in a support 40. At its upper end the shaft 37 has a hand wheel 41 and it carries upon it an adjustably positioned index member 42, which, in co-operation with a fixed speed gauge 43, indicates the setting of the cam.

The means for controlling discharge of refuse from the wash box includes a float 44 which is carried at the lower end of a rod 45. In the form shown the rod is squared but it might be of any shape. It is guided between pairs of grooved rollers 46, 46 and may also carry stops 47. The supports for the guides and rollers are not shown in the diagrammatic drawing of Figure 1. They might be mounted upon any convenient support.

Adjacent its upper end the rod 45 carries a pointer 48 which, in co-operation with a depth gauge 49, indicates the position of the float and the depth of the refuse bed.

A fixed stop 50 may also be mounted adjacent the rod 45, to be contacted by the lower stop 47 in order to limit upward movement of the rod; its downward travel is limited by the upper stop 47, engaging the upper rollers 46. Fig. 5 illustrates a mechanically operated mercury switch, actuated by means of a fixed trip member 75 on the float rod 45, for starting and stopping the electric motor 18. Upon a suitable base member 51 a mercury switch 52 is mounted. It is carried in a cradle-like member 53 pivoted as at 54. A spring 55, fixed at its upper end to a portion of the cradle 53 and at its lower end upon the adjusting screw 55a, serves to hold the switch in whichever position it occupies. It will be seen in Figure 5 that the points of attachment of the upper end of the spring to the cradle 53 is to the right of the bearing 54 and so holds the parts in that position. If the cradle is tilted to the left the spring will hold it in that position. The cradle 53 has pivoted to it a link 56 the lower end of which is movably received within a slot 57 in a tilting lever 58. The lever 58 is pivoted as at 59 in a support 60 carried upon any suitable base. The lever 58 has open jaws 61, 61, adapted to be contacted by the stop 75 on the rod 45. A spring 62 is fastened as at 63 to a portion of the lever 58 and at its other end it is fastened to an adjustable screw 64. This spring 62 has the effect of holding the movable part to which it is attached in whichever position it occupies until it is forcibly moved away. Thus, by the arrangement shown in Figure 5, the mercury switch is held in one position until positively moved from it by movement of the rod 45 and consequent contact of the stop 75 with one or the other of the jaws 61. If the rod moves downward from the position of Figure 5, by contact with the lower jaw 61 it will tilt the lever 58 downwardly and thus, through the rod 56, it will rock the cradle 53 to the left. The springs have the effect of snapping the parts into the new position and holding them there and the lower jaw 61 will then have been moved downwardly out of the path of the stop 75 so that it may continue farther downward if the rod 45 moves in that direction. When the rod 45 moves in the reverse direction the process just described takes place in the reverse order. The preferred form of apparatus is that shown in Figures 3 and 4 in which, instead of a mercury switch, light means are used to energize and control the motor circuits.

The rod 45 carries two vanes or shields 65 and 66. They serve, when in the proper position, to intercept or interrupt beams of light or other energy. Where in the specification and claims "light" is referred to, it may be visible or invisible. It may be ultra-violet, infra-red or any other wave energy, and the invention is in no way limited to visible light nor to any other form of light or energy.

The electrican mechanism illustrated herewith in its details forms no essential part of the present invention. It is, however, illustrated diagrammatically and the full wiring diagram is given in Figures 3 and 4 to illustrate one form of a complete electrical mechanism by means of which the automatic wash box control is accomplished to maintain the refuse bed in the condition and of the thickness desired.

Within the housing 67 is mounted a photo-electric cell, together with such other mechanism as is desired. A similar photo-electric cell is mounted in the box or housing 68. It will be understood that the housing is provided with an opening and through that opening a beam of light or energy may be projected or may pass to contact or actuate the photo-electric cell. Directed toward the upper box 67 are two light sources 69 and 70. Directed toward the lower box 68 are two light sources 71 and 72. As will be seen from Figure 1, when the rod 45 occupies one position the vanes are in a position to interrupt the beams directed toward both of the photo-electric cells contained in the boxes 67 and 68. In other positions of the rod one or more of the beams will be uninterrupted so that the photo-electric cells may be actuated by one or more of the beams from one or the other or several of the light sources 69, 70, 71 and 72. 73 is a control panel and 74 is a two-speed starter. The starter might be omitted.

The wiring diagram will be described in detail below.

Referring to Figures 3 and 4, the main power lines 76, 77 and 78, controlled by a master switch 80, are connected to the multiple switches 81 and 82, actuated by relays 83 and 84 on the panel 74. The switch 81 controls the wires 85 leading to the slow speed winding of the motor 18, herein illustrated as being a three phase induction motor. The other multiple switch 82 is, by means of wires 86 joined to the high speed winding of the motor. The motor may, for example, have an eight pole winding for high speed and a twelve pole winding for low speed. However, any other suitable two speed motor may be employed. The wiring diagram is for a two speed motor, but it is obvious that if desired it may be wired for a single speed motor.

Connected to the main lines 77, 78 are wires 87, 88, completing a circuit through the primary winding of a step down transformer 89, the secondary winding of which communicates with the main power lines 90 and 91 for the auxiliary control circuits. The lines 90 and 91 complete an electrical circuit through the primary winding or windings of a transformer 92, the secondary windings of which supply energy to the light sources 69, 70, 71 and 72, which may be 32 candle power, 6 volt lamps. The light sources 69 and 71 are continuously energized by the lines 93, 94, leading to their respective secondary windings of the transformer 92. The light source 70, connected as by the lines 95 and 96 to one of the secondary windings of the transformer 92 is controlled by a switch member 98, interposed in the line 96, of a multiple switch 97, actuated for example by a solenoid 99.

The light source 72 is connected by lines 100 and 101 to its respective secondary winding of the transformer and is controlled by a switch member 103, interposed in the line 100 of a multiple switch 102, controlled by a solenoid 104.

Referring to Figure 3, the housing 67, diagrammatically indicated in dotted lines, contains a photo-electric tube 106, an amplifier tube 107, a sensitive relay 108 for actuating a switch 109 and a transformer 110, for supplying the necessary current for the various parts. The wiring is of the conventional type, for operating the various parts. A light beam, striking the photo-electric cell 106, sets up an electric current, which is amplified by the tube 107 to energize the relay 108, which in turn closes the switch 109. The primary winding of the transformer 110 is connected by wires 111 and 112 to the main power lines 90, 91 of the transformer 89.

The housing 68 contains a photo-electric tube 113, an amplifying tube 114, a sensitive relay 115 for actuating a switch 116 and a transformer 117. The wiring and operation of the parts are identical as above described. The primary winding of the transformer is in circuit with the main power lines 90 and 91 by means of the lines 118 and 119. Normally, the light source 69, in line with the photo-electric cell 106, and the light source 71, acting upon the photo-electric cell 113 are continuously energized. Assuming that the vanes 65 and 66 carried by the float rod 45 are in the positions shown in Figures 1 and 3, the light rays of the light sources 69 and 71 are interrupted. However, as the layer of impurities 17 increases in depth, the float 44, supported upon the impurities, elevates the rod 45 until the vanes 65 and 66 assume the dotted line position of Fig. 3. In this position light rays from the light source 71 strike the photo-electric cell 113 which in turn energizes the relay 115 and closes the switch 116 as above described. The switch 116 closes a circuit from the line 119, connected to the power source from the transformer 89 by line 90, through the line 120, one of the switch members 121 of the multiple switch 97, the line 122, solenoid 104, line 123 and line 91 to the transformer.

The solenoid 104 is thus energized and actuates the multiple switch member 102, breaking a switch connection 124, and closing the switch members 103 and 125. The switch member 103 closes the circuit through the lamp 72, the purpose of which is to serve as a holding circuit. This is necessary because of the pulsating motion of the float which may occur about once a second, which would result in a continuing interruption of the light beam from the light source 71, and consequently of the several actuating members, which is undesirable. The switch member 125 completes a circuit through the relay 83, which closes the multiple switch 81 and thus completes a circuit through wires 85 leading to the slow speed winding of the motor 18 which in turn rotates the refuse gate 6. The relay 83 receives electric impulse through power line 90, line 126 to said relay, thence through the line 127, including the switch member 125 of the multiple switch 102 and a switch member 128 of the multiple switch 97, to the other power line 91.

If the speed of the motor is sufficient to discharge and lower the level of the accumulated impurities 17 by means of the refuse gate 6, the float rod will recede to a lower level until the vane 66 interrupts the light beam from the light source 72 and de-energizes the photo-electric unit in the housing 68, and permits the switch 116 to break the circuit through the solenoid 104 and relay 83, which renders the low speed winding of the motor ineffective.

However, if the impurities 17 in the wash box continue to build up and raise the float rod 45 a predetermined distance, the vane 65 clears the light beam of the light source 69 and energizes the photo-electric cell 106 and associated parts in the housing 67. Consequently the switch 109 is actuated by means of the relay magnet 108 and closes a circuit through the solenoid 99 which actuates the multiple switch 97. The circuit through the solenoid 99 includes the main power line 90 from the transformer 89, line 112, line 129 and interposed switch 109, through the solenoid 99 and the line 123 connected to the other power line 91 leading to the transformer 87.

Actuation of the multiple switch 97 by means of the solenoid 99 results in breaking the electric connections made by the switch members 121 and 128, thus de-energizing the solenoid 104 and the relay 83 which controls the slow speed winding 85 of the motor 18 and closing the switch member 98 and a switch member 130. The switch member 98 energizes the light source 70 above described, its function is similar to that of the light source 72 of the photo-electric unit 68. The switch member 130 establishes an electrical circuit through the relay 84 and closes the multiple switch 82 to connect the power lines 76, 77 and 78 with the wires 86 associated with the high speed winding of the motor 18. The completed circuit through the relay 84 is thus from the main power line 90, through lines 126, 131 to the relay, thence through line 132, switch member 130 of the multiple switch 97, shunt wire 133, switch member 124 of the multiple switch 102, line 127 and main power line 91 to the transformer 89. The motor will continue to run at high speed until the vane 65, carried by the float rod 45 has descended sufficiently to mask the light rays from the lamp 70. This renders the photo-electric unit in the housing 67 ineffective and the multiple switch 97 returns to its original position as shown in Figure 4, and consequently the multiple switch 82 is opened and disconnects the electric source to the high speed winding of the motor 18.

The light source 71 comes again into play and by means of the photo-electric unit 113 in the housing 68, the low speed winding 85 of the motor 18 is electrically connected to the power lines 76, 77 and 78. In order to protect the motor 18 any suitable temperature overload relays 134 and 135 may be inserted into the circuits for the high and low speed windings adapted to break the electric circuits of their respective relays 83 and 84. A circuit breaker 136 may also be provided for the auxiliary power line 90.

It will be realized that mechanical means, as illustrated in Figure 5, may be employed for actuating a switch or switches to control the motor 18. The wires 137 and 138 of the mercury switch 52 taking the place of either one of the lines 119 and 120, and wires from an additional mercury switch unit, similar to that shown in Figure 5, may take the place of or be connected to the lines 112 and 129. Of course, the lines 111 and 118 and the lines for the light sources are omitted from the installation of Figure 5. The operation of the solenoids 99 and 104 remain the same.

Referring to the variant form illustrated in Figures 6 and 7, the wash box, refuse gate, float and part of the drive mechanism for the refuse gate are the same as those shown in the earlier figures and are indicated by like numerals. However, instead of a multiple speed motor, there is a constant speed motor 178 for driving the connecting rod 25. An additional motor 182 serves to vary the speed of the refuse gate 6 by means of the mechanism below described.

The pawl 26, which engages the teeth 28 of the ratchet 29 is provided with a roller 140 which rides upon the cam surface of a disk 141. The cam surface is formed with a reduced portion 142, permitting the pawl 26 to engage the ratchet teeth and a raised camming portion 143 to lift and disengage the pawl 26 from the ratchet 29. In other words, the pawl is adapted to be raised out of engagement with the ratchet teeth during part of rotation of the radius arm 27. A spring 144 serves to thrust the pawl 26 and roller 140 into operative position.

In order to vary the setting of the cam disk 141 for either increasing or reducing the degree of rotation of the refuse gate at each stroke of the connecting rod 25, the cam disk 141, which is mounted free to rotate upon the shaft 7, is provided with an extension arm 145 to which is pivoted an adjustable link 146. The opposite end of said link is pivoted to a lever 147 rotatably mounted in a suitable bracket 148 on the frame of the wash box.

Intermediate its ends the lever 147 engages the plunger rod 149 of a thruster 150 which comprises the motor 182, driving a centrifugal fluid pump which creates pressure under the piston 151 and lifts the piston rod 149. A predetermined oil pressure is maintained beneath the piston as long as the motor is in operation. When the motor 182 is de-energized, the piston and rod are lowered to their initial position by means of a counterweight 152 on the lever 147.

The raising and lowering of the thruster shaft 149 raises and lowers the lever 147 and moves the cam disk 141 to adjust it. The degree or amount of movement thus given to the disk 141 is controlled by the following means.

Mounted on the shaft 7 for rotation independently of the shaft is a disk 153, positioned at the far side of the ratchet wheel 29 as viewed in Figures 6 and 7. The disk 153 may be shaped with a camming surface for an additional pawl, such as shown in Figure 1.

The disk 153 is provided with a rigid arm similar to the arm 145, both of which carry a roller or pin 154. In alignment with the pin 154 are arms 155 and 156, rotatably mounted upon the shaft 7. There is one arm for each pin, the arm 156 limits counterclockwise or upward rotation of the disks 141 and 153, whereas the arm 155 limits clockwise or downward rotation of the disks 141 and 153. That is to say, the actuating members for disks 141 and 153 are limited in their respective up and down movements by the setting of the arms 155 and 156. The arms may be provided with corresponding notches to be engaged by the pins 154 as shown.

Adjustment of the arms is accomplished by a means which may include the connecting links 157 pivoted at one end, respectively, to the arms 155, 156. The opposite ends are pivoted to suitable members upon the threaded adjusting shafts 158 and 159 in threaded relationship with the interiorly threaded nuts or bars 160 mounted upon a support 161. At their upper ends the shafts carry hand wheels 162 and 169, respectively, and may further be provided with index members 163, which, in co-operation with fixed speed gauges 164 indicate the setting of the arms 155 and 156, and the control of the motors 178 and 182 is accomplished as follows: The float rod 45 carries contact bars 165 and 166, adapted to come into contact with or in close proximity with their co-operative contact brushes. The contact bar 165 is in alignment with the contact brushes 203 and 204 and the contact bar 166 is in alignment with the brushes 207 and 208. Holders for the brushes are mounted on suitable insulating panels 167 fastened to a frame structure 168, which is supported above the wash box. The frame structure 168 may also support control apparatus below described. Note that the contact bar 165 is so positioned upon the float bar 45 to contact its co-operating contact brushes ahead of the contact bar 166, for reasons set out in detail below.

Figure 8 illustrates a suitable wiring diagram for actuating the mechanism of the wash box shown in Figure 6.

The main power lines 170, 171 and 172, controlled by a switch 173, are connected to a multiple switch 174, which is actuated by a relay 175 on the panel 176. The switch 174 controls the wires 177 leading to the constant speed motor 178, herein illustrated as being a three phase induction motor, for operating the refuse gate.

Branch lines from the power lines 170, 171 and 172 extend to another multiple switch 179 on the control panel 180. A relay 181 serves to operate the switch 179 to close a circuit through the wires 183 and the motor 182 associated with the thruster 150 above described.

184 and 185 are housings, diagrammatically indicated by dotted lines, which contain part or all of the actuating means. In the housing 184 is a power transformer 186, a power relay 187, a sensitive relay 188, an adjustable variable condenser 189, an amplifier tube 190 and various parts which are electrically connected in a conventional manner.

The housing 185 contains similar members, which include a power transformer 191, a power relay 192, a sensitive relay 193, a variable condenser 194 and an amplifier tube 195.

The primary windings of the power transformers 186 and 191 are energized by the power lines 196 and 197, supplying the necessary voltage. The power relay 187 is connected to said power lines 196 and 197 by a line 198, which is normally interrupted by a movable switch member 199 associated with and actuated by the sensitive relay 188. Likewise, the power relay 192 is shunted across the power lines 196, 197 by a line 200, which is normally broken by a switch member 201 co-operating with the sensitive relay 193.

Connected to one of the wires, adjacent the variable condenser 189, is a line 202 leading to one of the contact members 203 on the antenna panel 167. A second contact member 204 is separated from the member 203 by a suitable resistance 205.

In a similar manner, one of the wires of the variable condenser 194 is attached to a line 206 extending to a contact member 207, which is also separated from a companion contact member 208 by a resistance 209.

The circuits of the control parts above described are grounded as at 210 and 211 to their respective housings which in turn are grounded to the wash box.

An electrical connection is provided for the relay 175 by means of the line 212 connected to the power line 171, the other line 213 of the relay extends to a switch member 214 cooperating with the power relay 187, from which a line 215 continues to the power line 172.

The relay 181, which actuates the multiple switch 179 for energizing the thruster motor 182 receives current from the power line 171 by means of a line 216, a wire 217 leading to a switch member 218 and a line 219 connected to the other power line 172. The switch member 218, normally held in open position, may be closed by the relay 192, to energize the relay magnet 216.

For the protection of the motors 178 and 182, suitable overload relays 220 and 221 may be interposed into their respective circuits in order to break the electrical circuits of the relays 175 and 181.

Referring to the variant form, illustrated in Figure 9, a swinging gate 230 is substituted in place of the rotary refuse gate 6.

Rotatably mounted upon a pivot 232 on the discharge chute 4 of the wash box is the swinging gate 230. The gate is formed with an arcuate closure plate 231 conforming to the arcuate open outlet of the discharge chute 4. Pivotally connected to an arm 233, integral with the gate 230 is a link 234. The link 234 is pivoted at its opposite end to an adjusting block 235 mounted to move in a guiding member 236, which may be fastened to a suitable bracket 237 secured to the wash box. The block 234 is threaded to receive the threaded shaft 238 of a motor 250.

Projecting in opposite directions from the sliding block 235 are pins 239 and 240 adapted to engage the limit switches 259 and 264, respectively, to interrupt the electric current and to stop the motor 250. The limit switch 259 stops the motor 250 when the parts have assumed the positions shown in full lines, with the swinging gate completely closing the open end of the discharge chute 4. When the motor is reversed and actuated by means described below, rotation in the opposite direction of the motor shaft 238 raises the block 235 until the pin 240 engages the limit switch 264. The various parts then assume positions indicated in dotted lines in Figure 9, the arcuate plate 231 of the swinging gate 230 clearing the opening of the discharge chute 4. The parts may assume many different positions between extreme upper and extreme lower positions shown in Figure 9.

Means for controlling and reversing the motor 250 may include a contact shoe 241 on the float rod 45 adapted to engage, or to come in close proximity with, a pair of contact brushes 242 and 243 and a pair of contact brushes 244 and 245. Interposed between the contact brushes are resistance coils 246 and 247. Note that the contact brushes 244 and 245 are positioned above the contact brushes 242 and 243 for purposes described below. The brushes, guide roller for the float rod and control means may be mounted in a manner similar to that described and shown in Figure 6.

Referring to Figure 10, which illustrates a suitable electrical circuit for operating the motor 250, the operating parts and wiring thereof in the housings 184 and 185 are identical with those illustrated in Figure 8 and above described, with the exception of the switch members 214 and 218. In place of the switch 214, the power relay 187 actuates a pair of switch members 251 and 252, whereas the switch 218 is replaced by a multiple switch 253 and 254.

The power lines 255 and 256, which may be controlled by a double knife switch 257, extend to suitable contact members associated with the multiple switch members. The switch member 251 is connected by a line 258 to one side of the motor 250 as at 260, which, however, may be broken by the limit switch 259. The companion switch member 252 is attached to a wire 262 leading to the opposite side of the motor winding as at 261.

The switch member 253, co-operating with the power relay 192 in the housing 185 is connected to the line 263 leading to the motor winding at 261. The limit switch 264 serves to break the line. The switch member 254 is in circuit with the line 265 connected to the motor winding as at 260.

The motor 250 may be of any suitable type wired for reversing rotation of the armature by means of a reversing switch, which, as illustrated in Figure 10, is indicated by the switch members 251, 252 and switch members 253, 254 operable by their respective co-operating power relays 187 and 192.

In the form of the apparatus shown in Figure 9, the swinging gate is upper-cut, that is, the gate swings upward to open. For many purposes this has an advantage. Normally the heavier material is in the bottom of the discharge chute. Since the upper-cut gate swings upward it opens at the bottom of the chute first and permits the discharge of the heavier material rather than the lighter, intermediate or bone material which would tend to be discharged if the gate were under-cut or downward swinging for opening. While this is a preferable construction, the invention is not limited to it and an under-cut gate or any other style of swinging or moving gate might be used without departing from the spirit of the invention.

The use and operation of the invention are as follows:

Whatever the details of the light or energy projecting mechanism, whatever the details of the motor drive or of the refuse gate, in general the mechanisms have the following features of operation in common.

Whatever the form of wash box, there will be one or more refuse gates and the gate, if rotary, rotates at the desired rate of speed to produce a bed of refuse of the desired thickness or depth and it is one of the objects of the invention to provide an automatic electrical control, preferably photo-electric, for maintaining a bed of refuse of the desired thickness. The automatic control operates to vary the operation of the refuse gate to speed it up or to slow it down, or otherwise to control it to insure a proper discharge of refuse.

In the form shown with a rotary gate, the gate is operated by the pawls which engage the teeth of the ratchet and are moved by the connecting rod 25. In the form here shown the crank 24 has two positions at which the connecting rod 25 may be attached to vary its movement. The speed of the motor is controllable and the pawls are controllable. As shown herewith there are two pawls operated by the connecting rod from the crank. As two pawls are used, variations of one-half tooth in the adjustment may be secured. Further adjustments are obtained by using a cam which controls the number of teeth engaged. This is the cam 30 which is adjusted through the linkage described above by means of the hand wheel 41. The marker 42 on the adjusting shaft 38, together with the gauge 43, indicates the number of teeth which are engaged. Where the cam overlies the ratchet it holds the pawls out of contact with the teeth so that they merely slide over it. Thus setting the cam governs the number of teeth which are open to engagement by the pawl. The motor speed is also preferably susceptible of governing so that this provides an additional means for controlling the speed of operation of the discharge gate. In the form shown herewith the motor is a two-speed motor and by controlling the cam to govern the number of teeth engaged and by controlling the motor speed, the operation of the rotary gate can be controlled through very wide ranges. With the motor operating at low speed, for example, the speed of the gate may be controlled from one revolution in forty minutes for one-half tooth engagement, up to one revolution in two minutes for ten teeth engagement at each stroke, while with the motor in high speed the range is from one revolution in twenty minutes to one revolution in one minute. These figures are given as being merely typical of practical installations which have been made.

The element which contacts the refuse is the float 44. It is preferably made of aluminum or otherwise made as light as possible and is mounted in rotary guides such as the rollers 46 which are preferably provided with anti-friction bearings so that the float and the float rod move as freely as possible and the weight, friction and inertia present where mechanically connected floats are used is avoided. In practice the float will ordinarily be weighted to conform to the specific gravity of the material which is to be discharged through the rotary gate. The float is thus caused to rest upon the refuse bed and to rise and fall with it. The beam of light or other energy which is used is weightless, frictionless and imposes no load whatever on the float, thereby in no way affecting the sensitiveness of the float, so that the float may move readily and freely in instant response to variations in the refuse bed.

The beam of light or energy is projected from the light source and is directed toward an aperture in the housing of the photo-electric cell. With the parts in the position shown in Figure 1, each beam of light is intercepted by a vane on the float rod. The vanes are so positioned on the rod that they will be in the position shown in Figure 1 when the refuse bed is thin.

Should the refuse bed now increase in depth, the float will be raised, thus moving the vanes upward and the vane 66 will first move out of the path of the lower light source 72 permitting it to fall onto the photo-electric cell within the housing 68.

Photo-electric cells form, in their details, no part of the present invention. In general, in the present installation, the photo-electric cells are of the caesium oxide type. When light falls on the caesium oxide, electrons are given off and move about within the surrounding space. With voltage across the electrodes, the electrons will transmit a current across the intervening space. This is ordinarily a very small current and to be effectively used for the present purpose it must be amplified and this is done in a tube of the radio type. The current is amplified sufficiently to enable it to operate a telephone relay which in turn operates a multi-finger relay which starts the motor on its low speed connection. The light sources 71 and 72 may be designated low speed light sources and the sources 69 and 70 high speed light sources. Correspondingly the photo-electric cell contained within the housing 68 is the low speed cell and that contained within the housing 67 is the high speed cell. Ordinarily the lower light source of each pair, that is to say, the light sources 70 and 72, will not be energized. It is not until the vane 66 has raised sufficiently to free the beam from the light source 71, from interception, and until that beam energizes the caesium cell in the housing 68, that the lower light source 72 is energized. This cell may be called a "holding" light while the upper cell 71 is an "initiating" light. Similarly, 69 is the upper "initiating" light and 70 the upper "holding" light.

The purpose of the second or "holding" light source in each case is to serve as a holding circuit. This is made necessary by reason of the pulsating motion of the float which may occur in practice as often as once a second, and which may have an amplitude of from 1 to 1⅛ inches and if there were no holding circuit this pulsation would first admit light to the photo-electric cell and then the slight downward movement of the float would cut it off, thus producing a "jogging" of the motor. This is avoided, however, by the construction shown, because once the initiating light 71, for example, has been admitted to the photo-electric cell, the holding light 72 which is lower, is energized and the motor will continue to run until the bed has subsided sufficiently to allow the lower vane 66 on the float rod 45 to cut off both beams, that is to say, both the beam from the initiating light 71 and that from the holding light 72.

If, after the motor has been started and continued in operation by the initiating and holding light sources 71 and 72, the refuse bed continues to rise, the vane 65 will be gradually moved out of the path from the beam from the upper or high speed initiating light source 69 and will energize the photo-electric cell in the high speed housing 67. When this occurs the high speed holding light source 70 will be energized. The energizing of the upper photo-electric cell by the beam from the light source 69 operates the relay contained in the housing 67 and starts the motor on its high speed windings, thus speeding up the movement of the discharge gate. With the discharge gate now moving more rapidly the bed of refuse will be reduced and if this reduction is carried out sufficiently, first the high speed lights will be cut off by the vane 67 and finally the low speed lights will be cut off by the vane 66. It is to be understood that the vanes are so positioned that one or the other of them is always intercepting the light from its light sources so that the motor is energized, either at low speed by the low speed windings or at high speed by the high speed windings.

If decrease in the depth of the refuse bed is carried on sufficiently, the motor is first slowed down and then finally stopped. In the position shown in Figure 1 it is stopped, because the lower vane 66 intercepts lights 71 and 72 while the upper vane 65 intercepts lights 69 and 70. With the parts in this condition, if the supply of coal or other material being cleaned is continued to the wash box, the bed of refuse will build up again and the operation described above will recur. It will be understood, of course, that ordinarily the parts are set so that these extreme fluctuations are avoided. In fact it is one of the purposes of the invention to avoid them and to provide an automatic means for avoiding them by maintaining the discharge rate through the refuse gate at the speed necessary to maintain as nearly as possible constant and uniform operation. By manual setting, the cam is positioned as far as possible to achieve the desired rate of discharge and the setting of the gate 9 is also directed to this purpose, but beyond these manual settings and in addition to them the control of discharge movement from the refuse bed is accomplished automatically and positively by the photo-electric means and processes above described.

The operation of the device illustrated in Figures 6, 7 and 8 is as follows:

When the float rod 45 is raised by means of the bed of impurities in the wash box, the contact bar 165 comes into contact, first with the contact brush 204 and then with the companion contact brush 203. A small electrical impulse is induced in the wire 202 which is connected with the amplifying unit in the housing 184.

The electrical impulse is created by means of the ground connection 210, or the ground connection 211, as the case may be, and the float rod 45, which is also grounded with the frame of the wash box. The contact bar 165 functions in a way like an antenna, since the contact bar or bars do not actually have to come in contact with the co-operating contact brushes; coming into close proximity is sufficient.

The electrical current so induced is amplified by the tube 190 and associated parts and energizes the sensitive telephone relay 188, which in turn closes the switch 199 and thus energizes the power relay 187. The power relay 187 in turn actuates the switch 214 and closes a circuit through the relay 175 on the control panel 176, which closes the multiple switch 174 and starts the motor 178.

The contact brushes 203 and 204 serve generally the same purpose as the light sources of Figures 1 and 3. On the upward travel of the contact bar 165 the contact brush 204 serves no purpose on account of the resistance 205 which is interposed between its companion contact brush 203. The winding of the sensitive relay is such as to be effective only initially, when the upper contact brush 203 is reached by the contact bar 165. However, after the sensitive relay is once energized, it will stay thus, even after the bar 165 recedes, until the bar again clears the lower contact brush 204 and thus breaks the above circuits.

In other words, during the upward movement of the float rod 45, the motor 178, for rotating the refuse gate, is energized, when the contact bar 165 reaches the upper contact brush 203, and remains in operation until the bar 165 clears the lower contact brush 204.

The contact brushes 207 and 208, co-operating with the lower contact bar 166, function similarly to the brushes 203 and 204 in their co-operation with contact bar 165. The upper brush 207 serves as a starting means for the motor 182 of the thruster 150, whereas the lower brush 208 acts as a holding means and causes the motor 182 to remain in operation until the contact bar 166 on its downward travel clears the lower contact brush 208.

The contact bars 165 and 166 are so positioned upon the float rod 45 as to start the motor 178, which rotates the refuse gate 6, when the float rod reaches a predetermined height. If the bed of impurities continues to rise in the wash box and raises the float rod 45 still higher, the motor 182 of the thruster is, in addition, put into operation until the contact bar 166 has receded sufficiently to clear the lower contact brush 208.

In general the gate, in the form shown in Figures 6 and 7, is operated by the motor 178 and the associated driving members 24 and 25 which rock the radius arm 27 at a constant speed. The camming surface of the cam disk 141 governs the distance through which the pawl or pawls 26 are in engagement with the ratchet wheel 29. This distance of engagement is increased by means of the thruster 150, lever 147 and connecting link 146 which rotates the cam disk counter-clockwise, thus exposing a larger degree of pawl engaging cam surface in the path of the pawl roller 140. Rotation of the camming disk 141 may be varied by means of the adjusting wheels 162 and 169, which control the setting of the arms 155 and 156.

In operation, the antenna or contact shoe 241 is initially in its lowermost position, adjacent or in contact with the lower brush 242, the gate 230 being closed and associated actuating members in the full line position shown in Figure 9. As the depth of bed of impurities increases in the wash box, the float rod 45 carrying the contact shoe rises until the contact shoe 241 is adjacent to or engages the uppermost brush 245, and an electric current is induced into the wire 206, leading to the amplifying unit in the housing 185. The various parts, already referred to in the description of Figure 8, energize the relay 192, and close an electrical circuit through the motor 250 by means of the switch members 253, 254. The current may run from the power line 256, through the switch member 253, line 263, limit switch 264 to one side of the motor 250 as at 261, thence through the line 265 and switch 254 to the other power line 255.

The motor 250, thus started, continues to run in the direction to lower the adjusting block 235 and associated members until the parts approach or assume the dotted line position, shown in Figure 9, at which point the pin 239 breaks the contacts of the limit switch 254 and stops the motor. The swinging gate 231 is thus opened permitting the impurities to discharge through the open end of the discharge chute 4. As the float rod 45 and contact shoe 241 recede the companion contact brush 244 is effective until the contact shoe has dropped sufficiently to clear it. Should the float rod recede fast enough for the shoe to break away from the lower contact brush 244, the screw threaded shaft of the motor, thus rendered immobile, retains the gate and co-operating members in whatever position they may have assumed.

As soon as the contact shoe 241 on the float rod comes into contact with the lowermost contact brush 242, the electric energy set up in the wire 202 and amplified by the amplifying unit in the housing 184 energizes the electro-magnet or relay 187 and closes the switch members 251 and 252. The circuit through the motor winding of the motor 250 is then reversed from that which caused the opening of the gate 231, and consequently causes the motor shaft 238 to run in the opposite direction. The electric current runs now from the main power line 256 through the switch 251, line 258, limit switch 259 to the motor 250 as at 260, thence through the line 262 and switch 252 to the other power line 255.

The motor, thus energized, raises the sliding shoe 235 and closes the swinging gate 230, 231. The pin 240 opens the motor circuit by means of the limit switch 259, when the parts have again assumed the full line position in Figure 9.

The impurities may again collect and build up and raise the float rod 45. The power unit and relays in the housing remain energized until the contact shoe 241, on its upward excursion, clears the upper companion contact brush 243. The resistance members 246 and 247 function precisely as the resistance members 205 and 209 of Figure 8.

In the specification and claims the expression "wash box" has been used. This is not to be taken as limiting the invention or its application to a device in which there is a box proper. The invention is not limited to any particular shape of washer. The expression "wash box" is used because it is common in the art, but the invention might equally well be applied to a device no matter what the shape of the container within which the washing takes place and the phrase "wash box", therefore, is not limiting.

We claim:

1. In combination in a mechanism, a movable control member, a plurality of energy responsive means adjacent said member, energy projecting means positioned adjacent said member opposite each of said energy responsive means, a plurality of intercepters carried by said member, the number of intercepters being the same as the number of energy responsive means, said control member being adapted to be moved to position said interceptors into and out of the paths of energy from said energy projecting means, and electric control means for said mechanism operatively associated with said energy responsive means arranged to be energized and deenergized in response to energy from said projectors when the interceptors are in non-shielding position with respect to said energy responsive means, whereby the operation of said control means is varied by the movement of said member and said control intercepters, each of said energy projecting means associated with the respective energy responsive means comprising plural sources of energy spaced along the path of movement of said control member and defining the range of movement through which each interceptor is effective to control its associated energy responsive means.

2. In combination in a material handling mechanism, a movable control member positioned to be contacted and moved by said material, a plurality of energy responsive means adjacent said member, energy projecting means positioned adjacent said member opposite each of said energy responsive means, a plurality of intercepters carried by said member, the number of intercepters being the same as the number of energy responsive means, said control member being adapted to be moved by said material to place said interceptors into and out of energy from the paths of said energy projecting means, and electric control means for said mechanism operatively associated with said energy responsive means arranged to be energized and deenergized in response to energy from said projecting means when the interceptors are in non-shielding position with respect to the energy responsive means, whereby the operation of said control means is varied by the movement of said control member and said intercepters, each of said energy projecting means associated with the respective energy responsive means comprising plural sources of energy spaced along the path of movement of said control member and defining the range of movement through which each interceptor is effective to control its associated energy responsive means.

3. In combination in a mechanism, a movable control member, a plurality of photo-electric cells adjacent said member, light sources positioned adjacent said member opposite said photo-electric cells, a plurality of intercepters carried by said member, the number of intercepters being the same as the number of photo-electric cells, said control member being adapted to be moved to position said interceptors into and out of light from the paths of said light sources, and electric control means for mechanism operatively associated with said photo-electric cells, means to energize and deenergize said control means in response to energization of said photoelectric cells by light from the respective light sources, whereby the operation of said control means is varied by the movement of said control member and said intercepters, there being at least two light sources for each photoelectric cell positioned to direct beams of light thereupon, said light sources being spaced along the path of movement of said control member and defining the range of movement through which each interceptor is effective to control energization of its associated photo-electric cell.

4. In combination in a material handling mechanism, a movable control member positioned to be contacted and moved by said material, a plurality of photo-electric cells adjacent said member, light sources positioned adjacent said member, and opposite said photo-electric cells, a plurality of intercepters carried by said member, the number of intercepters being the same as the number of photo-electric cells, said control member being adapted to be moved by said material to position said interceptors into and out of light from the paths of said light sources, and electric control means for said mechanism operatively associated with said photo-electric cells, means for energizing and deenergizing said control means in response to energization of said photo-electric cells when light from the respective light sources impinges thereon, whereby the operation of said control means is varied by the movement of said control member and said intercepters, there being at least two light sources for each photoelectric cell positioned to direct beams of light thereupon, said light sources being spaced along the path of movement of said control member and defining the range of movement through which each interceptor is effective to control energization of its associated photo-electric cell.

5. In combination, in an operating mechanism including a longitudinally movable stem, a plurality of photo-electric cells positioned in operative relationship to said stem, light sources adapted to direct light against said photo-electric cells and a plurality of light intercepting means operatively associated with the stem and movable in response to movement of said stem into light shielding and non-shielding position with respect to the photoelectric cells, means operable in response to operation of said mechanism for imparting movement to said stem, and a plurality of control mechanisms respectively responsive to the activation of said photo-electric cells, there being at least two light sources operatively associated with each photo-electric cell and arranged to project beams of light thereon, said light sources being spaced along the path of movement of said control member and defining the range of movement through which each interceptor is effective to control energization of its associated photo-electric cell.

6. In combination in a mechanism, a movable control member, an energy responsive means adjacent said member, energy projecting means positioned adjacent said member opposite said energy responsive means, means for maintaining said energy projecting means normally energized, an energy interceptor carried by said member and normally interposed between the energy projecting means and the energy responsive means, control means for said mechanism operable in response to energization of said energy responsive means by energy from said energy projecting means, said control member being positioned to be moved in response to operation of the mechanism to move the interceptor out of alignment with the energy projecting means, a second energy projecting means spaced with respect to said first-mentioned energy projecting means, and means responsive to the impingement of energy from the first projecting means upon the energy responsive means to energize said second energy projecting means whereby to permit the movable control member to regain its normal position before the inceptor carried thereby is effective to shield the energy responsive means from said energy projectors.

7. The combination recited in claim 6 wherein there is provided a second energy responsive means spaced along the path of movement of said control member with respect to the first mentioned energy responsive means, energy projecting means associated with said second energy responsive means, and a second energy interceptor carried by said movable control member and movable into shielding and non-shielding positions with respect to said second mentioned energy responsive means, said second mentioned energy interceptor normally shielding its associated energy responsive means throughout ranges of movement of said control member within which said first mentioned energy interceptor is effective to shield its associated energy responsive means, and means operable in response to continued movement of the movable member in the same direction to an extent sufficient to remove said second mentioned energy interceptor from light shielding position with respect to its associated energy responsive means to render said first mentioned energy responsive means ineffective to control said control means for said mechanism.

8. The combination recited in claim 6 wherein there is provided a second energy responsive means spaced along the path of movement of said control member with respect to the first mentioned energy responsive means, energy projecting means associated with said second energy responsive means, a second energy interceptor carried by said movable control member and movable into shielding and non-shielding positions with respect to said second mentioned energy responsive means, said second mentioned energy interceptor normally shielding its associated energy responsive means throughout ranges of movement of said control member within which said first mentioned energy interceptor is effective to shield its associated energy responsive means, and means operable in response to continued movement of the movable member in the same direction to an extent sufficient to remove said second mentioned energy interceptor from light shielding position with respect to its associated energy responsive means to transfer the control of said control mechanism from the first mentioned energy responsive means to said second mentioned energy responsive means.

9. In combination in a mechanism, a movable control member, a photoelectric cell positioned adjacent said member, the light source positioned to project light upon said photoelectric cell, means for maintaining said light normally energized, a light interceptor carried by said member and normally interposed between said light and said photoelectric cell, a second photoelectric cell spaced along the path of movement of said movable control member, a second light source arranged to project light upon said second mentioned photoelectric cell, means for maintaining said second light source normally energized, a second light interceptor carried by said movable control member and normally intercepting light from said second mentioned light source, dual control means for said mechanism, means for rendering said dual control means selectively operable in response to energization of said photoelectric cells, respectively, said second mentioned light interceptor being dimensioned to exclude light from its associated photoelectric cell until after the first mentioned light interceptor moves to non-shielding position with respect to its associated photoelectric cell, continued movement of said member in the same direction exposing said second mentioned photoelectric cell to light from its associated light source, and means operable to render the first mentioned photoelectric cell ineffective to control said control mechanisms upon energization of the second mentioned photoelectric cell.

10. In combination in a mechanism, a movable control member, a photoelectric cell, a light source positioned to project a beam of light upon said cell, means for normally maintaining said light source energized, and a light interceptor carried by said control member and normally shielding said photoelectric cell from rays of light from said light source; a second photoelectric cell spaced along the path of movement of said control member, a light source positioned to direct a beam of light on said second photoelectric cell, means for maintaining said second light source normally energized, and a second light interceptor carried by said movable member and normally interposed between said second light source and said second photoelectric cell; a low speed control and a high speed control for said mechanism; means operable in response to energization of the first mentioned photoelectric cell to actuate said low speed control and means operable in response to energization of said second mentioned photoelectric cell for actuating said high speed control and for simultaneously rendering said first mentioned photoelectric cell ineffective to exercise supervisory control over said low speed control means.

11. In combination in a mechanism, a movable control member, a photoelectric cell, a light source positioned to project a beam of light upon said cell, means for normally maintaining said light source energized, and a light interceptor carried by said control member and normally shielding said photoelectric cell from rays of light from said light source; a second photoelectric cell spaced along the path of movement of said control member, a light source positioned to direct a beam of light on said second photoelectric cell, means for maintaining said second light source normally energized, and a second light interceptor carried by said movable member and normally interposed between said second light source and said second photoelectric cell; a low speed control and a high speed control for said mechanism; means operable in response to energization of the first mentioned photoelectric cell to actuate said low speed control, means operable in response to energization of said second mentioned photoelectric cell for actuating said high speed control and for simultaneously rendering said first mentioned photoelectric cell ineffective to exercise supervisory control over said low speed control means, a normally deenergized auxiliary light source associated with each primary light source, and means for energizing the respective auxiliary light sources in response to energization of the respective photoelectric cells whereby to define the range of movement through which each interceptor is effective to control its associated photoelectric cell.

EDWARD J. BURNELL.
WARD J. HEACOCK.